United States Patent [19]

Stants

[11] Patent Number: 4,520,274
[45] Date of Patent: May 28, 1985

[54] METHOD AND APPARATUS FOR CONTROLLING THE LOADS OR A PLURALITY OF UNITS ON A SHARED SOURCE

[76] Inventor: Richard O. Stants, 1508 Pontiac Dr., Kokomo, Ind. 46902

[21] Appl. No.: 516,388

[22] Filed: Jul. 22, 1983

[51] Int. Cl.$^3$ ............................................... H02J 3/14
[52] U.S. Cl. ........................................ 307/39; 307/41; 307/126; 364/493
[58] Field of Search ................... 307/38, 39, 41, 117, 307/126; 364/493

[56] References Cited

U.S. PATENT DOCUMENTS 4,463,432  7/1984  Carter .............................. 307/39 X
4,477,733 10/1984  Herdeman ....................... 307/41 X Primary Examiner—Patrick R. Salce
Assistant Examiner—Derek S. Jennings
Attorney, Agent, or Firm—David A. Lundy

[57] ABSTRACT

An apparatus for controlling loads of a plurality of units on a shared source which includes a timer interfaced with a computer controlling the connection of each individual unit to the source on an individual basis for a connection period. The timer controls the connection and disconnection of each unit from the source for connection and disconnection periods. Sensors exist on each unit, each sensor having an output while registering differences between a nominal value of an operating parameter of the sensor's unit and an actual value of the operating parameter. The computer compares over time each sensors output to determine an adjustment value of the approximate relative difference over time between the nominal value of the unit's operating parameter and the actual value of the unit's operating parameter. The computer adjusts the timer to compensate for each unit's relative length of disconnection period to the length of connection period in proportion to the adjustment value of the unit. The computer can also reset the timer to sequentially repeat the controlling, connecting, and disconnecting of the units to the source.

17 Claims, 3 Drawing Figures

METHOD AND APPARATUS FOR CONTROLLING THE LOADS OR A PLURALITY OF UNITS ON A SHARED SOURCE

BACKGROUND OF THE INVENTION

The present invention pertains to utilization of shared sources and more particularly to a method and apparatus for controlling the loads of a plurality of units on a shared source such as the electrical loads of a plurality of heating and cooling units.

Generally in the past, control of utilization of a shared source, such as a source of electric power by a plurality of units, has not been centrally provided. What was instead done, in for example the case of cooling units, was that each unit was provided with an individual thermostat and the facility in which the cooling units were housed was supplied with a sufficient electrical supply to handle a simultaneous start-up load of all the units. Recent changes in electrical utility billing procedures penalize this approach by adding a surcharge based on peak power demand during a billing period. The peak demand period measured by the electrical utility is a short period of time, usually fifteen or thirty minutes. A prior method to cut this peak demand has been duty cycling. In duty cycling units are connected and disconnected at a predetermined rate. Duty cycles and connect times of different units can be offset to reduce total peak load. The disadvantage of duty cycling is that it eliminates the flexibility of individual units to respond to changes in conditions. With, for example, an air conditioning system of a restaurant, this inability to meet changes in load, such as the arrival of a large number of customers, severely limits the utility of duty cycling. Problems of this kind are partially overcome by another prior art method in which units are controlled by duty cycles varied in accordance with the previous day's loads of the units upon the source. Any changes in loads or demands from those of the previous day are handled by manually overriding the established duty cycles. This method is effective where loads do not vary much on a daily basis, however, if conditions require the override to be used often, peak load is increased and utility of the method greatly decreased.

It is therefore highly desirable to provide an improved method and apparatus for controlling the loads of a plurality of units on a shared source that duty cycles those units. It is also highly desirable to provide an improved method and apparatus for controlling the loads of a plurality of units on a shared source, that offsets connect times of those units. It is yet also highly desirable to provide an improved method and apparatus for controlling the loads of a plurality of units on a shared source, that can decrease the total connection period of the plurality of units on the source by 20%. It is further highly desirable to provide an improved method and apparatus for controlling the loads of a plurality of units on a shared sources, that can vary duty cycles with variations in load and demand. It is likewise highly desirable to provide an improved method and apparatus for controlling the loads of a plurality of units on a shared source, that has override and underride duty cycle levels for each unit, which may be used in situations of unusual load but which do not eliminate the offset connect times of the units nor duty cycling of the units. It would finally be highly desirable to provide an improved method and apparatus which meet all of the above desired features.

SUMMARY OF THE INVENTION

It is an object of the invention to provide an improved method and apparatus for controlling the loads of a plurality of units on a shared source that duty cycles those units.

It is another object of the invention to provide an improved method and apparatus for controlling the loads of a plurality of units on a shared source, that offsets connect times of those units.

It is also another object of the invention to provide an improved method and apparatus for controlling the loads of a plurality of units on a shared source, that can decrease the total connection period of the plurality of units on the source by 20%.

It is yet another object of the invention to provide an improved method and apparatus for controlling the loads of a plurality of units on a shared source, that can vary duty cycles with variations in load and demand.

It is still a further object of the invention to provide an improved method and apparatus for controlling the loads of a plurality of units on a shared source, that has override and underride duty cycle levels for each unit which may be used in situations of unusual load but which do not eliminate the offset connect times of the units nor duty cycling of the units.

It is yet also another object of the invention to provide an improved method and apparatus which meets all of the above-desired features.

In the broader aspects of the invention there is provided a method for controlling the loads of a plurality of units on a shared source, comprising the steps of: setting for each said unit a nominal value of an operating parameter responsive to load, connecting each unit to the source, keeping each connected unit connected to the source for a connection period for that individual unit, disconnecting each connected unit from the source following its connection period, keeping each unit disconnected from the source for a disconnection period for that individual unit, determining for each unit, while the unit is not connected to the source, an adjustment value of the approximate relative difference over time between the nominal value of the unit's operating parameter and the actual value of the unit's operating parameter, adjusting for each unit the difference in relative lengths of its disconnection period and its connection period in proportion to the adjustment value for the unit, and sequentially repeating the connecting, first keeping, disconnecting, second keeping, determining, and adjusting steps. An apparatus for performing the method of the invention is also disclosed.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figure 1:
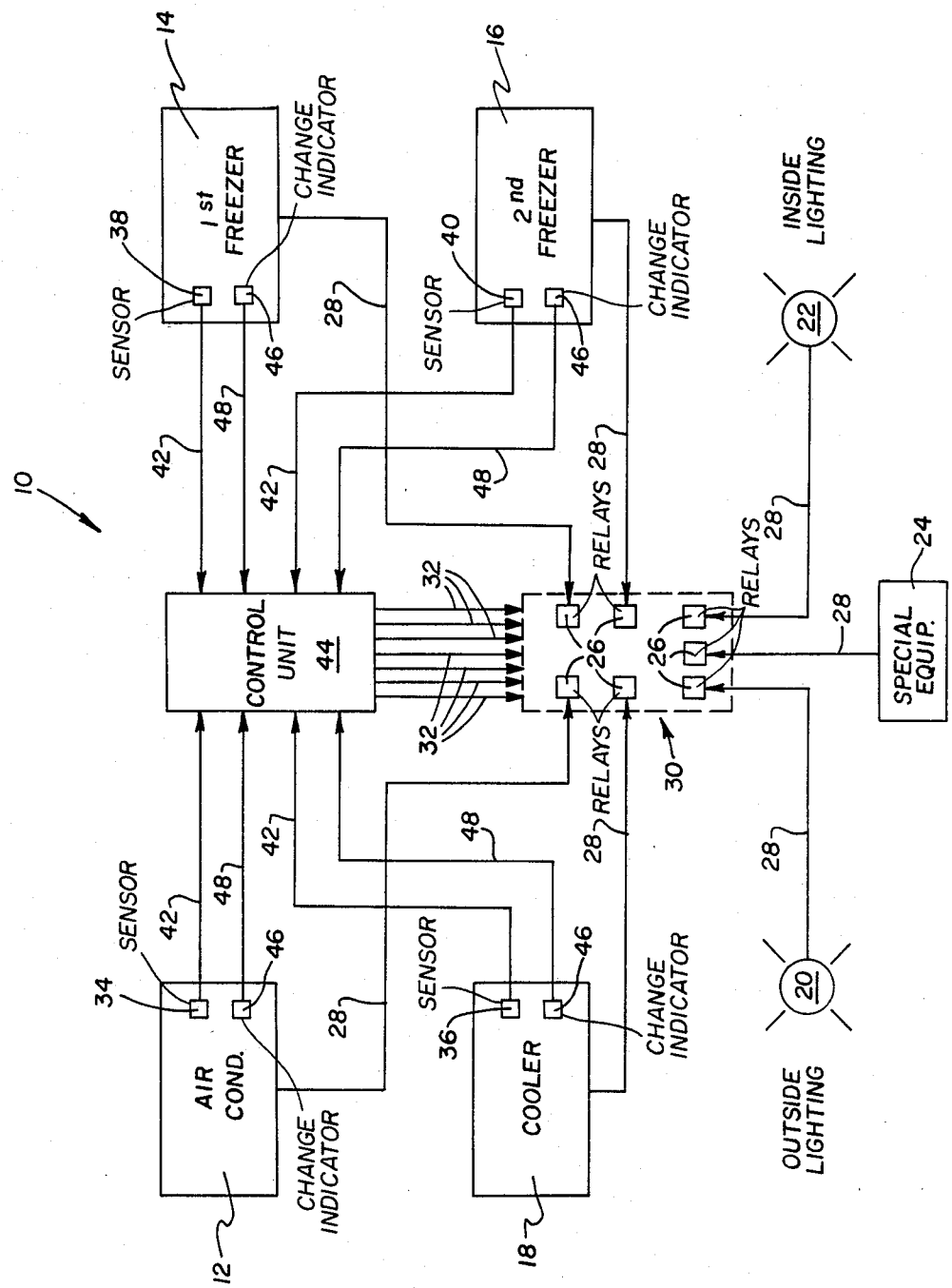
FIG. 1 is a diagram of the apparatus of the invention installed in a commercial setting and controlling a variety of units.

The method of the invention generally comprises the following steps.

The first step is setting, for each unit to be controlled, a nominal value of an operating parameter responsive to the load of the unit on the source. The terms actual value and nominal value of operating parameters in this application refer not to exact physical qualities such as exact temperatures but rather to approximate values of physical qualities within the limits of accuracy of sensors used to determine those values. In the specific embodiment described herein, the units to be controlled are heating and cooling units the source is an electrical power source and the operating parameter for each unit is temperature, however, other units, sources and operating parameters are within the invention disclosed.

The next step of the method is connecting each unit to the source at a connect time for that unit. In the specific embodiment described herein, the connect times for the units are offset from each other. The amount of the offsets between connect times depends upon the application. In a situation where the start-up load of the units would be much larger than the running load, such as with heating and cooling units, and where the source is limited in comparison to a possible total start-up load of all units, the offset between the connect times of one unit and another would be determined by the time required for a first started unit to decrease its start-up load to the level of its running load. In other applications, the offsets would be determined by the peak demand period imposed by the electric utility. In a specific embodiment of the invention the connect times of the units and the offsets of those connect times from each other are invariant.

The remaining steps are: keeping each connected unit connected to the source for a connection period for that individual unit, disconnecting each connected unit from the source following its connection period, keeping each unit disconnected from the source for a disconnection period for that individual unit, determining for each unit, while the unit is not connected to the source, an adjustment value of the approximate relative difference over time between the nominal value of the unit's operating parameter and actual values of the unit's operating parameter, adjusting for each unit the difference in relative lengths of the disconnection period and the connection period in proportion to the adjustment value for the unit and sequentially repeating the connecting through adjusting steps.

In a specific embodiment of the invention the length of a connection period plus the length of the following disconnection period is invariant.

The apparatus 10 of the invention operates in the manner of the method of the invention. In a typical commercial installation the apparatus 10 controls a plurality of electricity consuming units such as an air conditioner 12, a first freezer 14, a second freezer 16, a cooler 18, outside lighting 20, inside lighting 22 and special equipment 24. The units are joined to relays 26 by connectors 28. The relays 26 are housed in a relay enclosure 30 and are individually connected to the control unit 44 by connectors 32. Sensors 34, 36, 38, 40 are joined to the control unit 44 by connectors 42. In the specific embodiment described herein, a minimum change indicator 46 on each heating or cooling unit 12, 14, 16, 18 is connected to the control unit 44 by connectors 48. The apparatus 10 of the invention cycles units that can be intermittently operated. Other units such as lighting 20, 22 and special equipment 24, that must be operated continuously when needed are each connected to the source at a preselected connect time offset from the connect times of other units and are left connected during the entire time they are needed.

In the specific embodiment described herein, the apparatus 10 also provides for variable operation of individual units as desired on a daily or other regular basis.

The control unit 44 adjustably times intervals, operates relays, and determines the adjustment values on a cyclical basis. In a specific embodiment, the control unit may comprise a combination of interacting timers and counters, including a daily timer, operation cycle timers for each unit, connection timers for each unit, and sensor output counters for each unit. In the embodiment described herein, the control unit has a programmable computer and programmable timer interconnected to operate together. The programmable computer may be a Texas Instruments 510 Programmable Controller and the programmable timer may be an AMF (Paragon) EC 702 or EC 701 Programmable Timer.

In the embodiment described herein, operation cycles are timed for each unit. The operation cycle for a unit has a length equal to the units connection period plus its disconnection period.

During operation cycles, individual connection periods, time periods for connection of units to the source, are timed. A connection period starts, at the beginning of an operation cycle with a connect time for the unit, the time at which the relay between that unit and the source is actuated to connect the unit to the source. In the specific embodiment described herein, the connect time for each unit is held invariant and the unit's connect time and operation cycles are offset from those of all other units. A unit, however, in this embodiment, may or may not be connected to the source during every operation cycle.

At the end of a unit's connection period is the disconnect time, the time at which the unit's relay is actuated to disconnect the unit from the source. The unit remains disconnected from the source for its disconnection period, the remainder of the operation cycle.

After each disconnect time, while a unit is not connected to the source, that is during the disconnection period or during the disconnection period and one or more operation cycles during which the unit is not operated, the unit's sensor produces outputs which are directed to the control unit.

In a specific embodiment, that output of the sensors is continuous and varies with quantitative differences between nominal values and actual values of unit's operating parameter. In that embodiment, the control unit calculates an adjustment value of the approximate differential over time between the nominal values and the actual values.

In the embodiment herein described, that output of the sensors is taken only at intervals, in this case 15 minute intervals, as a series of separate outputs. The outputs provide only an indication as to whether the actual value of a unit's operating parameter is above or below the nominal value of that parameter. The number of outputs of a unit sensor during the time a unit is disconnected from the source which indicate that the actual value of the unit's operating parameter is greater than the nominal value of that parameter are compared by the control unit to the number of outputs in which the actual value of the unit's operating parameter is less than the nominal value of that operating parameter.

In a specific embodiment, this determination provides a ratio of outputs above to outputs below which is an estimate of the relative difference over time between the nominal value of the unit's operating parameter and the actual value of that parameter. In that embodiment, the operation cycle level of the unit, that is the lengths of its connection period and disconnection period, is then adjusted to a new operation cycle level in which the connection period of the former operation cycle level and the connection period of the new operation cycle level relate to each other by the above-indicated ratio of outputs above to outputs below.

In the embodiment described herein, heating and cooling devices are controlled on a regular one hour operation cycle and each unit's operation cycle level is variable on a stepwise basis. A stepwise gradient of an underride level, six regular levels and an override level is provided for each unit. After each disconnect time, sensor outputs are taken at 15 minute intervals. The operation cycle level of a unit is raised or lowered, between the underride level and the override level, by a number of operation cycle levels equal to the difference between the number of those outputs above and the number of those outputs below the nominal value of the unit's operating parameter. The underride level and override level provide minimum and maximum relative lengths of connection periods to disconnection periods, respectively. The override level is not full time operation but rather an operation cycle based upon a percentage of full time operation. The underride level is likewise not a full time disconnection period.

The override level is based on a presumption of excess capacity in each unit beyond that needed to handle any foreseeable conditions of use of the unit. In a specific embodiment in which heating and cooling devices are utilized, an override level of approximately 80% of full time operation, an operating cycle level with a connection period equal to 80% of its total length, has been found satisfactory. The override level percentage could be higher or lower in a specific embodiment depending upon the excess capacity of the units controlled.

In the specific embodiment described herein, the length of a unit's operation cycle is variable when that unit is operating at an override or underride level. A determination is made, while the unit is not operating, if the relative lengths of the connection period and disconnection period of the unit cannot be adjusted in proportion to the adjustment value because the unit is at the override or underride level and a change to a regular level is not indicated. If such a determination is made, the operation cycle length is then shortened or lengthened on a predetermined basis in opposition to the adjustment value. The operation cycle is shortened where a longer relative connection period would be proportional to the adjustment value and the operation cycle is lengthened where a shorter relative connection period would be proportional. Disconnect times are changed proportionately. In embodiments in which regular level connect times of individual units are offset all connect times at regular, override, and underride levels of all units are also offset.

In a specific embodiment, the predetermined basis for changing the operation cycle is lengthening or shortening by a factor of two and the override level has possible operation cycle lengths of 60, 30 and 15 minutes. For example, if an adjustment value for a unit calling for an increased connection period was determined by the apparatus 10 of the invention and the apparatus 10 of the invention determined that the unit was operating at an override level, the apparatus 10 would change the operation cycle for the unit from one hour to thirty minutes. The relative lengths of the connection period and disconnection period to each other would not be changed. Operation cycles for other units would not be changed. At the end of the thirty minute cycle, if the adjustment value still called for an increased connection period the operation cycle would be decreased again by a factor of two to 15 minutes. No further decreases in operation cycle length would be possible and the unit would operate on that 15 minute operation cycle until decreased demand resulted in lengthening the cycle from 15 to 30 to 60 minutes and finally in a return to regular levels.

Figure 2:
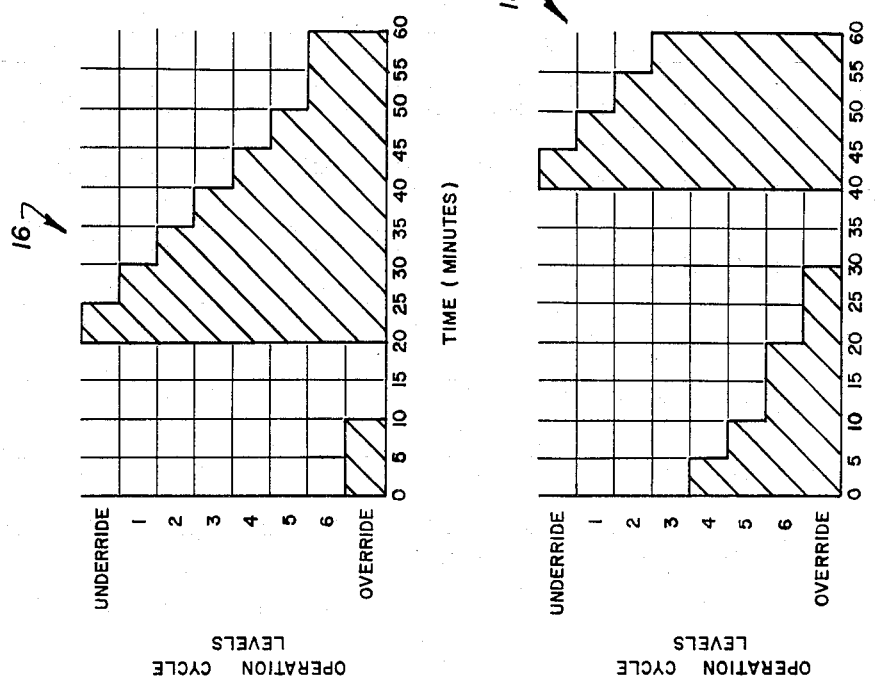
FIG. 2 is a series of four charts showing the simultaneous control of four units and available operation cycles of each unit.
Figure 2:
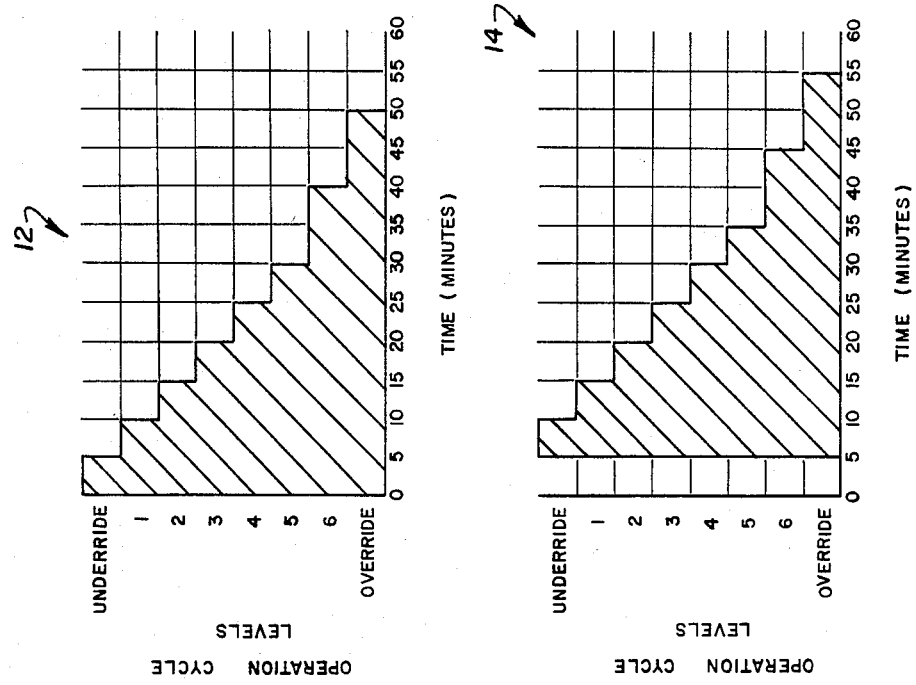
Figure 3:
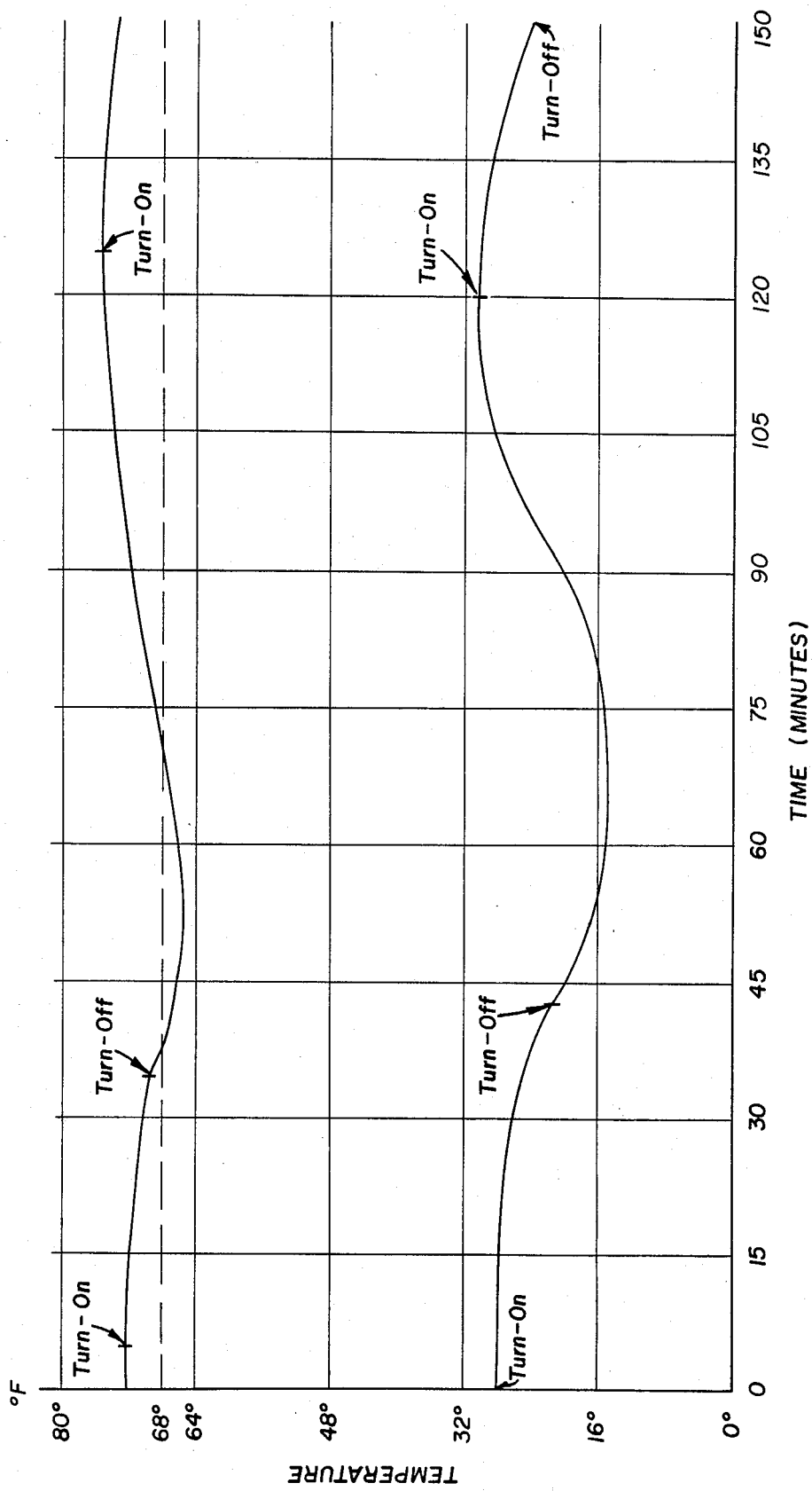
FIG. 3 is a graph showing exemplary operation cycles of two of the four units.

FIG. 2 illustrates possible operation cycles of four units controlled by the apparatus 10 of the invention during a one hour period. Only 60 minute operation cycles are illustrated for override and underride levels. In a typical commercial installation the units could be an air conditioner 12, a first freezer 14, a second freezer 16 and a cooler 18. The vertical axis on each graph represents possible operation cycle levels. Time is indicated on the horizontal axes of the graphs. Each level for each unit has a connection period and a disconnection period. Connection periods begin at a connect time and end at a disconnect time. Operation cycle levels vary on a stepwise basis. The connect times of the units are offset from each other at 0, 5, 20 and 40 minutes for the units 12, 14, 16 and 18 respectively.

The operation cycle level of each unit is independent of the operation cycle level of the other units controlled by the apparatus 10 of the invention. Thus at the same time, for example, the first unit could be at level 4 and have its connection period equal to its disconnection period, the second unit could be at level 1 and have its connection period at 10 minutes and its disconnection period at fifty minutes. The third unit could be at override level and have its connection period at fifty minutes and its disconnection period at ten minutes and the fourth unit could be at underride level.

In the embodiment described herein, a unit is not connected to the source during an operation cycle unless the minimum change indicator on the unit indicates a difference in the nominal value and actual value of the unit's operating parameter at the start of an operation cycle that is greater than a predetermined minimum change in value. The minimum change in value is set at a value determined by the limit of accuracy of the unit's sensor, the change in operating parameter of the unit available at the unit's lowest operation cycle level and the acceptable range of variation in the operating parameter of the unit.

If the minimum change in value for a unit is present, that unit is connected to the source at its connect time. In the situation of heating or cooling units, the minimum change indicator could have the same mechanism as a thermostat, however, it would not directly control operation of the unit but rather would provide outputs to the control unit.

The method and apparatus of the invention are useful in a wide variety of applications beyond control of heating and cooling units and control of devices that consume electric power. One specific embodiment of the invention is the control of access to a shared computer by terminals or to a computer's central processing unit by peripherals.

While a specific embodiment of the invention has been shown and described herein for purposes of illustration, it is desired that the protection afforded by any patent which may issue upon this application not to be limited strictly to the disclosed embodiment; but that it extend to all structures and arrangements and methods which contain the essence of the invention and which fall within the scope of the claims which are appended hereto:

What is claimed is:

1. A method for controlling the loads of a plurality of units on a shared source, comprising the steps of: setting for each said unit a nominal value of an operating parameter responsive to said load, connecting each said unit to said source, keeping each connected said unit connected to said source for a connection period for that individual said unit, disconnecting each connected said unit from said source following said connection period, keeping each said unit disconnected from said source for a disconnection period for that individual said unit, determining for each said unit, while said unit is not connected to said source, an adjustment value of the approximate relative difference over time between said nominal value of said unit's said operating parameter and the actual value of said unit's said operating parameter, adjusting for each said unit the difference in relative lengths of said disconnection period and said connection period in proportion to said adjustment value for said unit, and sequentially repeating said connecting, connected keeping, disconnecting, disconnected keeping, determining, and adjusting steps.

2. The method of claim 1 wherein said connecting step further comprises the step of: connecting each said unit to said source at a connect time for said unit, said connect time for said unit being offset from said connect times for every other said unit.

3. The method of claim 1 wherein said adjusting step further comprises the step of: adjusting, for each said unit, the length of said connection period and said disconnection period while holding the total length of said connection period plus said disconnection period invariant.

4. The method of claim 2 wherein said connect times are invariant.

5. The method of claim 1 wherein said connection periods and said disconnection periods are adjusted in stepwise gradations.

6. The method of claim 1 wherein said determining step further comprises the steps of: ascertaining for each said unit at intervals when said unit is not connected to said source whether said actual value of said unit's said operating parameter is above said nominal value of said unit's said operating parameter, ascertaining for each said unit at intervals when said unit is not connected to said source when said actual value of said unit's said operating parameter is below said nominal value of said unit's said operating parameter, calculating for each said unit an adjustment value of the approximate relative difference over time between said nominal value of said unit's said operating parameter and said actual value of said unit's said operating parameter by determining the ratio of the number of intervals at which said actual value of said operating parameter is above said nominal value of said operating parameter for said unit and the number of intervals at which said actual value of said operating parameter of said unit is above said nominal value of said operating parameter of said unit.

7. The method of claim 1 wherein following said sequentially repeating step, said connecting, connected, keeping, disconnecting, and disconnected keeping steps are only performed on each of said units having more than a minimum difference in value between said nominal value of said operating parameter and said actual value of said operating parameter.

8. The method of claim 1 wherein said adjusting step further comprises: adjusting for each said unit the difference in relative lengths of said disconnection period and said connection period between an override level and an underride level in proportion to said adjustment value for said unit.

9. The method of claim 8 further comprising following said adjusting step, the step of: determining for each said unit whether said adjusting step adjusted said unit's said difference in relative lengths of said disconnection period and said connection period disproportionate to said adjustment value, changing said length of said disconnection period plus said connection period of said unit on a predetermined basis in opposition to said adjustment value.

10. The method of claim 1 wherein said source is a source of electrical power and said units are intermitently operating electrical devices.

11. An apparatus for controlling the loads of a plurality of units on a shared source, comprising: a timer controlling the connection of each unit of said plurality of units to said source on an individual basis for a connection period, said timer controlling disconnection of each said unit from said source for a disconnection period, sensors on each said unit, said sensors each having an output while registering differences between a nominal value of an operating parameter of said sensor's unit and an actual value of said operating parameter of said sensor's unit, means for comparing over time each said sensor's output to determine an adjustment value of the approximate relative difference over time between said nominal value of said unit's said operating parameter and said actual value of said unit's said operating parameter, means for adjusting said timer to adjust for each said unit the relative length of said disconnection period to the length of said connection period in proportion to said adjustment value for said unit, means for resetting said timer to sequentially repeat said controlling, said connecting, and said disconnecting of said units to said source.

12. The apparatus of claim 11 wherein said means for adjusting adjusts in stepwise gradations.

13. The apparatus of claim 11 wherein said means for comparing further comprises means for ascertaining for each said unit at intervals, while said unit is not connected to said source, whether said actual value of said unit's said operating parameter is above said nominal value of said unit's said operating parameter, means for ascertaining for each said unit at intervals while said unit is not connected to said source whether said value of said unit's said operating parameter is below said nominal value of said unit's said operating parameter, means for calculating an adjustment value of the approximate relative difference over time between said nominal value of said unit's said operating parameter and said actual values of said unit's said operating parameter by determining the ratio of the number of intervals at which said nominal value of said unit's said operating parameter is above said actual value of said unit's said operating parameter and the number of said intervals at which said actual value of said unit's said operating parameter is below said nominal value of said unit's said operating parameter.

14. The apparatus of claim 11 wherein the length of said connection period plus the length of said disconnection period for each said unit is invariant.

15. The apparatus of claim 11 wherein said timer controls said connecting of each said unit to said source at a connect time for said unit offset from said connect times for every other said unit.

16. The apparatus of claim 15 wherein said connect times measured by said timer are invariant.

17. The apparatus of claim 11 wherein said timer following said operation of said means for resetting said timer connects only those of said units to said source having more than a predetermined difference between in said unit's said nominal value of said operating parameter and said unit's said actual value of said operating parameter.

* * * * *